United States Patent [19]

Nagamine et al.

[11] Patent Number: 4,947,638
[45] Date of Patent: Aug. 14, 1990

[54] STEEL CORD FOR REINFORCING RUBBER

[75] Inventors: Akira Nagamine; Kenichi Okamoto; Hidekazu Nakata, all of Itami, Japan

[73] Assignee: Sumitomo Electric Industries, Ltd., Osaka, Japan

[21] Appl. No.: 450,106

[22] Filed: Dec. 13, 1989

[30] Foreign Application Priority Data

Dec. 16, 1988 [JP] Japan ................. 63-318884

[51] Int. Cl.⁵ ............... D02G 3/48; D60C 9/00; D07B 1/06
[52] U.S. Cl. ....................... 57/212; 57/200; 57/214; 57/218; 57/902; 152/451; 152/527; 152/556
[58] Field of Search ............ 57/200, 210–214, 57/218, 902; 152/451, 527, 556, 557

[56] References Cited

U.S. PATENT DOCUMENTS

| | | | |
|---|---|---|---|
| 4,586,324 | 5/1986 | Mizuma | 57/212 |
| 4,732,197 | 3/1988 | Heishi et al. | 152/451 |
| 4,738,096 | 4/1988 | Hatakeyama et al. | 57/902 X |
| 4,751,952 | 6/1988 | Imai | 152/527 |
| 4,781,016 | 11/1988 | Sato et al. | 57/213 |
| 4,788,815 | 12/1988 | Umezawa | 57/212 |
| 4,828,001 | 5/1989 | Takahira | 152/451 |
| 4,836,262 | 6/1989 | Nishizawa et al. | 57/902 X |

*Primary Examiner*—John Petrakes
*Attorney, Agent, or Firm*—Armstrong, Nikaido, Marmelstein, Kubovcik & Murray

[57] ABSTRACT

A steel cord for reinforcing rubber is made by twisting a plurality of strands each made by twisting a plurality of element wires. The cord and the strands are twisted in the same direction. The product of the twisting ratio of the cord and that of the strands, the elongation coefficient of the cord and other factors are determined so that the rubber penetration and the rigidity and tenacity of the cord will be suitable for the carcass cord of steel radial tire.

2 Claims, 1 Drawing Sheet

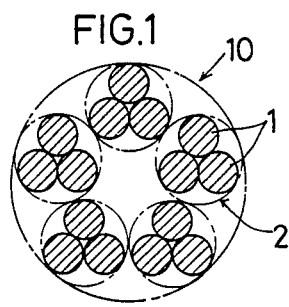
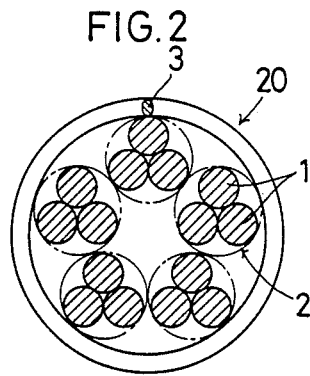
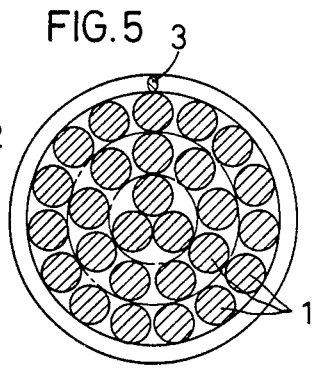
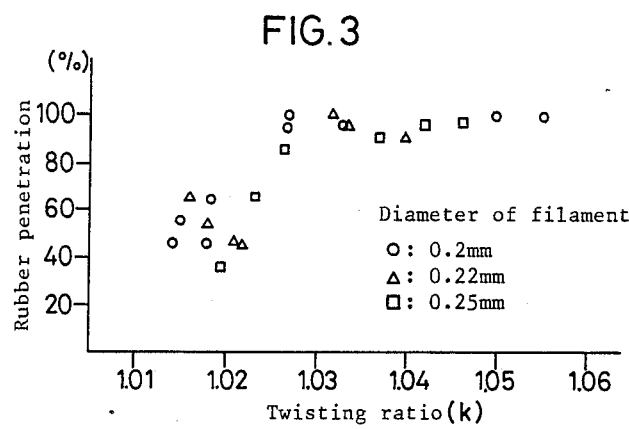
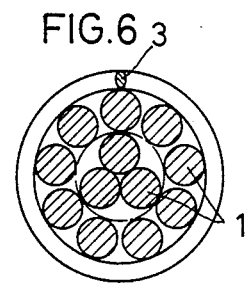
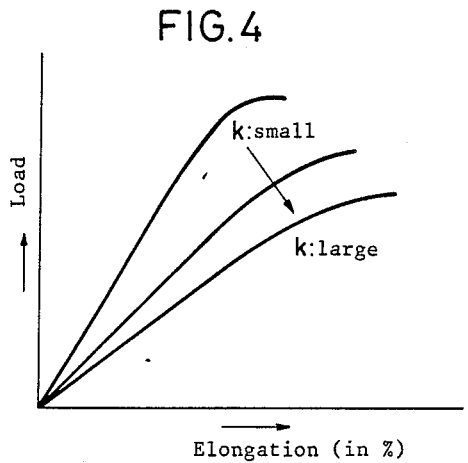
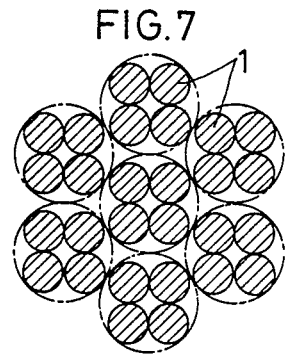

STEEL CORD FOR REINFORCING RUBBER

The present invention relates to a steel cord for reinforcing rubber suitable for use as a reinforcing material for a carcass portion of a steel radial tire for a truck or a bus.

A conventional steel cord used as a reinforcing material in a rubber composite material such as a steel radial tire is made by twisting high-carbon steel filaments (or element wires) having their surface brass-plated (plating of an alloy of copper with zinc) to increase their adhesion to rubber.

Such steel cords include a cord used for reinforcing a carcass portion of a steel radial tire for a truck or a bus. Since a cord for carcass is subjected to a static strain owing to the internal pressure of the tire and to repeated strains owing to the fluctuation of load resulting from the rolling of the tire, it is required to have a higher tenacity to withstand the internal pressure of the tire as well as a higher bending fatigue resistance to withstand the repeated strains than other steel cords. For this purpose, a prior art cord for carcass has e.g. a $(3+9+15\times0.175+w)$ construction as shown in FIG. 5 or a $(3+9\times0.22+w)$ construction as shown in FIG. 6. The latter w designates a steel filament 3 wrapped around the cord.

One problem with such multi-layered stranded cords is that rubber can not penetrate the cord so easily during vulcanization because as shown in the drawings the spaces formed between the adjacent element wires 1 are very small. This will cause fretting resulting from abrasion of the adjacent cords in the tire when they are subjected to repeated strains. This will lower the fatigue resistance of the cords and might allow the admission of moisture through a crack or opening in the tire, thus causing the rusting of cords.

On the other hand, Japanese Examined Patent Publications No. 62-18678 and 57-9963 disclose steel cords having larger spaces formed between the adjacent element wires. Another known cord shown in FIG. 7 has a $(7\times4\times0.175)$ construction and is actually used in some kinds of tires as a cord for the carcass. These cords have such a structure as to allow rubber to penetrate more easily during vulcanization and thus are free of the abovementioned problems inherent to the multi-layered stranded cords. But in spite of such advantages, they are not used so widely because of their high production cost.

There are also known other cords which allow easy penetration of rubber, such as an open cord made by twisting highly preformed element wires and a so-called high-elongation cord in which the twisting ratio is high to improve the elongation at break. But these cords are not statisfactory in other characteristics required for a carcass cord than rubber penetration.

It is required for a for carcass cord that (1) the rubber penetration, (2) the rigidity and (3) the tenacity be all within optimum ranges. The rubber penetration is determined by (a) the cord construction, (b) the preforming ratio of element wires and (c) the twisting ratio.

The cord rigidity is determined by the elongation coefficient (kgf/0.1% elongation) which is expressed with the tensile load per 0.1% elongation. The elongation coefficient (E′) is related to the Young's modulus of elasticity (E) and the transverse sectional area (S) of the cord, as follows.

$$E' = \frac{E \times S}{1000} \text{ (kgf/0.1\% elongation)}$$

The tenacity of the cord is determined by the tensile strength TS and the diameter of each element wire, the twisting ratio and the cord construction.

As will be apparent from the above description, the factors which determine the characteristics (1) to (3) of the cord are co-related to one another. Thus it is very difficult to set such factors that all the characteristics are within their respective optimum ranges.

For example, with an open cord or a high-elongation cord, if the abovementioned factors are so controlled that the rubber penetration will be sufficiently high, the other requirements for a carcass cord, such as the rigidity and the tenacity, will not be met.

It is an object of the present invention to provide a cord for use in a carcass portion of a tire which obviates the abovesaid shortcomings, which is inexpensive, which retains the advantages of a high-elongation cord and which meets the abovementioned three requirements within optimum ranges.

In accordance with the present invention, there is provided a steel cord for reinforcing rubber, comprising a plurality of strands twisted together, each strand comprising two to four element wires twisted together, the strands and the element wires being twisted in the same direction so that the product k of the twisting ratio of the cord and that of the strand which is given by the following formula will be 1.025 to 1.05, the cord having the elongation coefficient E′ [=Young's modulus of elasticity ×transverse sectional area of the cord (kgf/0.1% elongation)] of 6.0 to 11.0 after having been covered with rubber by vulcanizing.

$$k = \frac{\sqrt{(\pi D_1)^2 + P_1^2}}{P_1} \times \frac{\sqrt{(\pi D_2)^2 + P_2^2}}{P_2}$$

wherein:
P1 is the lay length of strand (mm)
P2 is the lay length of cord (mm)
D1 is the diameter of the circle connecting the centers of the strands (mm)
D2 is the diameter of the circle connecting the centers of the element wires (mm)

By limiting the number of element wires forming each strand and the twisting ratio to the above values, a high rubber penetration, which is required for a carcass cord, is obtained.

By limiting the twisting ratio and the elongation coefficient to the above values, the rigidity and tenacity of the cord can be controlled as required for a carcass cord.

Further, the productivity of the cord according to the present invention is high and its production cost is low for the reasons described hereunder.

A high-elongation cord has an excellent rubber penetration. This is because both the lay length of the cord and that of the strands are so small (i.e. the twisting ratio is high) that the spaces formed between the circumscribed circle of each strand and the element wires forming the strand are large. Rubber can penetrate the cord through the spaces. Another feature of a high-elongation cord is that the direction of twist of the strands is the same as that of the element wires forming each strand and thus the productivity is high. Thus the cord according to the present invention has the same construction and is twisted in the same manner as a high-elongation cord. Further, in order to improve the performances of the cord such as rigidity and tenacity to such levels as to be acceptable for a carcass cord, it is necessary that the twisting ratio be sufficiently small (i.e. the lay length is sufficiently large).

As a result, the abovementioned spaces will decrease in area. Since these spaces decrease in area as the number of element wires forming each strand increases, if the diameter of the strands is assumed to be unchanged, the number of element wires forming each strand should not be more than five. According to the present invention, the number of element wires forming each strand is limited to 2 to 4 in order to make up for the decrease in the spaces resulting from the decrease in the twisting ratio.

Although by decreasing the twisting ratio, other characteristics than the rubber penetration improve, the rubber penetration will be affected badly if the twisting ratio is reduced excessively. A cord having its strands formed of 2–4 element wires was put to a test to determine the lowest twisting ratio. The results are shown in FIG. 3, which indicates that the rubber penetration drops sharply if the twisting ratio is less than 1.025. Thus the twisting ratio should be more than 1.025.

The upper limit of the twisting ratio was determined in the manner as described below.

Assuming that the diameter of element wires and the cord construction are unchanged, the higher the twisting ratio (in other words, the smaller the lay length), the smaller the Young's modulus of elasticity and thus the less steep the gradient of the load-elongation curve at its straight portion as shown in FIG. 4. Also, the load at break will decrease accordingly.

On the other hand, a carcass cord, which is normally kept under a uniform tension during use owing to the internal pressure of the tire, has to withstand the tension without getting elongated. In order to reinforce the carcass portion, the elongation coefficient E' of the cord should be within a certain range, i.e. 6.0–11.0 kg.f/0.1% elongation (the load necessary to draw a cord enclosed in rubber by 0.1 per cent).

Although the increase in the twisting ratio makes the gradient of the load-elongation curve less steep at its straight portion, in order to increase the elongation coefficient, you had better increase the diameter of element wires forming the cord (this increases the lay length if the twisting ratio is unchanged) or increase the number of element wires.

But the larger the diameter of element wires forming the cord, the larger the bending strain which acts on each element wire will be. The bending strain acts on the element wires repeatedly as the tire rolls. This means that the larger the diameter of the element wires, the shorter the fatigue life of the cord. The present inventors found that the diameter of the element wires should not be more than 0.25 millimeter. On the other hand, the increase in the number of element wires will lead to an increase in the diameter of the cord as well as that of the circle connecting the centers of the strands and thus an increase in the twisting ratio.

A carcass cord should preferably have a diameter of 1.0 to 1.5 millimeters. The number of element wires should be limited to fifteen or less. Cords having the twisting construction according to the present invention were prepared by use of element wires having a diameter not more than 0.25 millimeter, changing the diameters and numbers of element wires and the twisting ratios. Young's modulus of elasticity (E) was measured for the respective cords. The measurement revealed that if $k>1.05$, then $E<8000$ when 15 wires having a diameter of 0.25 mm were used. From the formula: the elongation coefficient $E'$ = Young's modulus of elasticity (E) × the transverse sectional area(s) of the cord, it follows that if $E=8000$, then $E'=8000\times0.736=5.9<6.0$. In other words, if $k>1.05$, then the elongation coefficient is less than 6 kg f. For this reason, the k value should be not more than 1.05.

A steel filament may be wrapped helically around such a steel cord. This will bind the cord tightly and thus improve the shapability of the cord greatly. Such a cord can be advantageously used as a carcass cord because it can be wrapped around a bead wire rigidly when forming the tire by virtue of its excellent shapability.

Other features and objects of the present invention will become apparent from the following description taken with reference to the accompanying drawings, in which:

FIGS. 1 and 2 are sectional views of the steel cords embodying the present invention;

FIG. 3 is a graph showing the relationship between the rubber penetration and the twisting ratio;

FIG. 4 is a graph showing the load-elongation relationship;

FIGS. 5 and 6 are sectional views of prior art cords for use in a carcass portion of a tire; and FIG. 7 is a sectional view of a prior art cord which can be used for reinforcing a carcass of a tire.

Now referring to FIG. 1, a steel cord 10 is made first by twisting three high-carbon steel brass-plated element wires 1 to form a strand 2 and then by twisting five such strands 2 in the same direction as the twisting direction of the element wires. The product k of the twisting ratio of the cord and that of the strand should be 1.025–1.05. The elongation coefficient E' after having been covered with rubber by vulcanization was 6.0–11.0.

A steel cord 20 shown in FIG. 2 is made by helically wrapping a steel filament 3 having its surface treated in the same manner as with the element wires 1, around the steel cord of FIG. 1 having a (5×3) construction.

Next, the results of an evaluation test are shown below.

Cords No. 1 to No. 10 shown in Table 1 were prepared, of which Nos. 1–7 are cords according to the present invention and Nos. 8–10 are prior art cords. They were tested about the tenacity, Young's modulus of elasticity, the elongation coefficient and the rubber penetration. The results of measurement are also shown in Table 1. To measure the rubber penetration, the cords were embedded in rubber and taken out after vulcanization for 30 minutes at 150° C. under the pressure of 20 kgs/cm². The length of rubber adhering to the cord between the adjacent strands was measured. The rubber penetration was calculated by use of the following formula:

$$\text{Rubber penetration} = \frac{\text{length of rubber adhering}}{\text{length of specimen}} \times 100\%$$

This table shows that the cord according to the present invention is equivalent to or superior to the prior art cord in the rubber penetration.

Also, it is within the acceptable ranges in other properties for use as a cord for reinforcing a carcass.

TABLE 1

| Sample No | Cords of this invention | | | | | |
|---|---|---|---|---|---|---|
| | 1 | 2 | 3 | 4 | 5 | 6 |
| Twisting construction | 5 × 3 | 5 × 3 | 5 × 3 | 5 × 2 | 4 × 3 | 4 × 3 |
| Diameter of element wire (mm) | 0.20 | 0.22 | 0.25 | 0.25 | 0.22 | 0.25 |
| Lay length (mm) | 4.2S/12.1S | 4.2S/12.1S | 4.2S/12.1S | 4.2S/12.1S | 4.2S/12.1S | 4.2S/12.1S |
| Twisting ratio (k) | 1.0330 | 1.040 | 1.046 | 1.042 | 1.033 | 1.037 |
| Diameter of cord (mm) | 1.16 | 1.28 | 1.46 | 1.35 | 1.14 | 1.30 |
| Tenacity of cord (kgf) | 120 | 140 | 164 | 108 | 118 | 135 |
| Young's modulus E (kgf/mm$^2$) | 15100 | 13500 | 14300 | 13600 | 15600 | 13100 |
| Elongation coefficient E' (kgf/0.1% elongation) | 7.1 | 7.7 | 10.5 | 6.7 | 7.1 | 7.7 |
| Rubber penetration (%) | 90~100 | 90~100 | 70~80 | 90~100 | 90~100 | 90~100 |

| Sample No | Cords of this invention | Prior art cords | | |
|---|---|---|---|---|
| | 7 | 8 | 9 | 10 |
| Twisting construction | 6 × 2 | 7 × 4 | 3 + 9 + W | 3 + 9 + 15 + W |
| Diameter of element wire (mm) | 0.22 | 0.175 | 0.22 | 0.175 |
| Lay length (mm) | 4.2S/12.1S | 9.5S/12.7Z | 6.0S/12.0S/3.5Z | 5.0S/10.0S/16.0Z/3.5S |
| Twisting ratio (k) | 1.040 | 1.0250 | 1.0253 | 1.0390 |
| Diameter of cord (mm) | 1.32 | 1.22 | 1.21 (0.91) | 1.38 (1.08) |
| Tenacity of cord (kgf) | 103 | 175 | 123 | 175 |
| Young's modulus E (kgf/mm$^2$) | 13800 | 15000 | 15600 | 16200 |
| Elongation coefficient E' (kgf/0.1% elongation) | 6.3 | 10.1 | 7.1 | 10.5 |
| Rubber penetration (%) | 70~80 | 60~80 | 20~40 | 20~40 |

*1 The figure in bracket for the cord diameter is the diameter of the cord without a wrapping wire.
*2 The tenacity, Young's modulus and the elongation coefficient were measured after the cords have been covered with rubber.

What is claimed is:

1. A steel cord for reinforcing rubber, comprising a plurality of strands twisted together, said each strand comprising two to four element wires twisted together, said strands and said element wires being twisted in the same direction so that the product k of the twisting ratio of the cord and that of said strand which is given by the following formula will be 1.025 to 1.05, said cord having the elongation coefficient E' [=Young's modulus of elasticity ×transverse sectional area of the cord (kgf/0.1% elongation)] of 6.0 to 11.0 after having been covered with rubber by vulcanizing, the formula being:

$$k = \frac{\sqrt{(\pi D_1)^2 + P_1^2}}{P_1} \times \frac{\sqrt{(\pi D_2)^2 + P_2^2}}{P_2}$$

wherein:
P1 is the lay length of strand (mm)
P2 is the lay length of cord (mm)
D1 is the diameter of the circle connecting the centers of the strands (mm)
D2 is the diameter of the circle connecting the centers of the element wires (mm)

2. A steel cord as claimed in claim 1, further comprising a steel filament helically wrapped therearound.

* * * * *